March 20, 1962    H. D. RUSSELL ET AL    3,025,779
FILM PROCESSING MACHINE

Filed Sept. 17, 1957      9 Sheets-Sheet 1

HAROLD D. RUSSELL
CHARLES J. KUNZ
INVENTORS

BY

ATTORNEYS

March 20, 1962    H. D. RUSSELL ET AL    3,025,779
FILM PROCESSING MACHINE

Filed Sept. 17, 1957    9 Sheets—Sheet 5

HAROLD D. RUSSELL
CHARLES J. KUNZ
INVENTORS

BY R. Frank Smith

Steve W. Grembow
ATTORNEYS

March 20, 1962 H. D. RUSSELL ET AL 3,025,779
FILM PROCESSING MACHINE
Filed Sept. 17, 1957 9 Sheets-Sheet 7

HAROLD D. RUSSELL
CHARLES J. KUNZ
INVENTORS

BY
ATTORNEYS

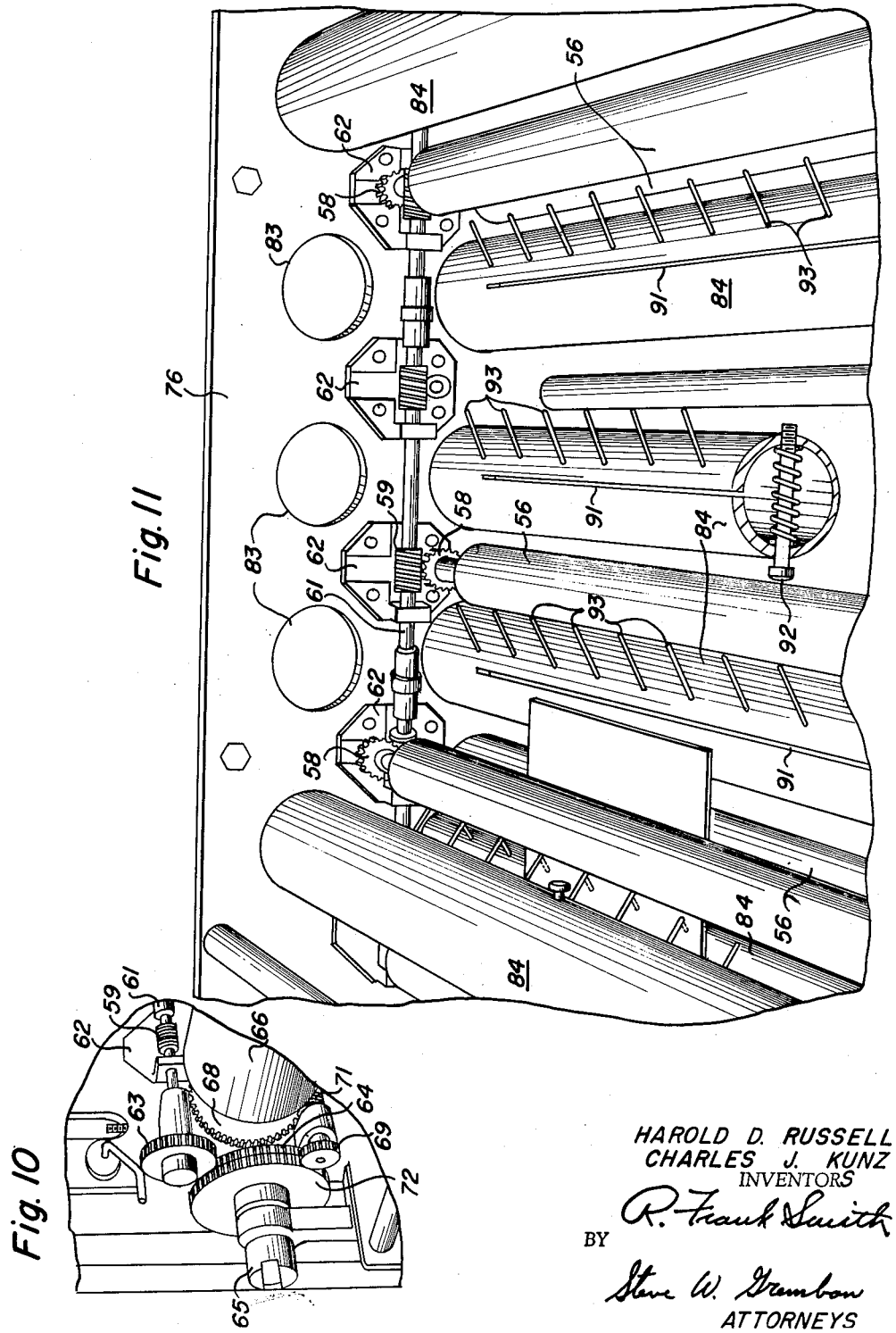

March 20, 1962 H. D. RUSSELL ET AL 3,025,779
FILM PROCESSING MACHINE
Filed Sept. 17, 1957 9 Sheets-Sheet 9

HAROLD D. RUSSELL
CHARLES J. KUNZ
INVENTORS

BY
ATTORNEYS

United States Patent Office 3,025,779
Patented Mar. 20, 1962

3,025,779
FILM PROCESSING MACHINE
Harold D. Russell and Charles J. Kunz, Rochester, N.Y., assignors to Eastman Kodak Company, Rochester, N.Y., a corporation of New Jersey
Filed Sept. 17, 1957, Ser. No. 684,552
13 Claims. (Cl. 95—94)

This invention relates generally to processing machines, and more specifically to an improved self-threading machine for processing film.

Apparatus for processing film having a gelatinous coating on one or both sides is well known in the art. By a gelatinous coating, applicants mean any natural or synthetic hydrophilic organic colloid such as gelatin, polyvinyl alcohol or the like. Apparatus presently commercially available on the market for processing this type of film generally comprises a series of tanks for holding the developing, fixing and washing solutions, film hangers for holding a single sheet of film, and a continuously movable transport system for supporting and moving the hangers through the solutions and into a drying chamber. The film hangers utilized in these machines each generally comprise a rectangular frame member having clip means for releasably securing a sheet of film thereto, and a hook for removably attaching the hanger to the transport system. The hanger system for supporting film has been adopted by the industry because it minimizes the physical contact to which the gelatinous coating of the film is exposed. The processing solutions and drying medium are the only elements in contact with the coating. Consequently, the danger of the gelatinous coating being marred or damaged is virtually eliminated. Although the adoption of hangers has been successful to the extent indicated, it is disadvantageous in that a complicated and bulky hanger transport system is needed to successfully transport the hangers through the machine. Consequently, the processing machines utilizing the film hangers and transport system are normally bulky and occupy a floor space of considerable area. Since these machines are often installed in hospitals and clinics where floor space is at a premium, the large area occupied by these machines is a disadvantage of considerable importance.

The transport of sheets of material by rollers is well known and is preferable to hangers because it is less bulky reducing the floor space requirements of the over-all processing machine, and provides a faster transport, thereby greatly reducing the time required to process a film, particularly where the material is transported through a tortuous path. However, the application of the roller-transport system to processing apparatus for gelatin-coated film in the past has been entirely unsuccessful resulting in a product of generally poor quality containing drying streaks and other imperfections. The gelatin-coated film when transported through a drying chamber passes through a critical drying period at which time the gelatinous coating becomes tacky. It appears that contact of the gelatinous coating by the rollers during the critical drying period coupled with non-uniform drying of the film has been responsible heretofore for the failure of the roller-transport system to successfully transport gelatin-coated film through the processing machine. Applicants have presently invented an improved processing machine for gelatin-coated film that is the first machine to successfully utilize the obviously preferred roller-transport system and produce a finished product more rapidly than any machines known heretofore and of consistently high quality.

Therefore, one of the primary objects of this invention is to provide an improved machine for processing gelatin-coated film in which the film is transported through all stages of the processing by a roller-transport system.

Another object of this invention is the provision of an improved processing machine for gelatin-coated film that greatly reduces the floor space requirements for the machine.

Still another object of the invention is the provision of an improved processing machine for gelatin-coated film that eliminates the need of film hangers.

A further object of this invention is to provide an improved processing machine for gelatin-coated film that greatly reduces the time required to completely process a sheet of film.

Still another object of the invention is the provision of an improved processing device for X-ray film and the like that will permit hospital patients to be released more quickly, will permit the examination of patients at any time during the day, and will permit a patient to be X-rayed and the X-ray film processed while he is undergoing an operation.

One more object of the invention is to provide an improved processing machine for X-ray film and the like that eliminates the necessity for taking wet readings which are sometimes required when using the prior art processing machines.

Still another object of this invention is the provision of an improved apparatus for X-ray film and the like that is more compact, of simple and efficient design and more economical than prior known processing apparatus.

Another object of this invention is to provide an improved drier for gelatin-coated film in which the film is transported by rollers and subjected to oppositely disposed uniform and symmetrical air streams directed normal to and extending across the entire width of the film.

And one more object of this invention is to provide an improved drier for gelatin-coated film that is adapted to successfully dry sheets of film of varying width without modifying the drying chamber.

Another object of this invention is the provision of an improved processing apparatus for X-ray film and the like that is simple to operate, requires a minimum of operator attention and produces a completed product of excellent quality and uniformity.

Objects and advantages other than those set forth will be apparent from the following description when read in connection with the accompanying drawings, in which:

FIG. 10 is a fragmentary perspective view of a portion of the structure of FIG. 9;

FIG. 11 is a fragmentary perspective view of a portion of the drier with several of the air tubes and transport rollers removed;

Figure 3:
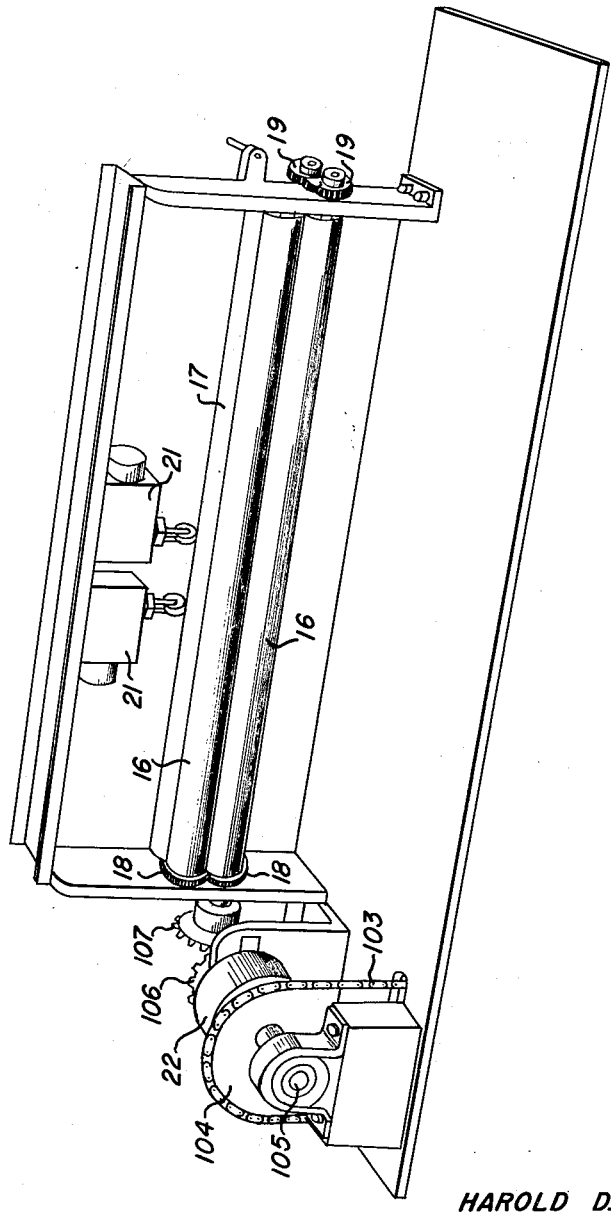
FIG. 3 is a perspective view of the roller-transport system of the film loading section.

As shown in the drawings, the machine for processing gelatin-coated film such as X-ray film or non-curl portrait film comprises three sections, namely, a film loading section 10, a wet processing section 11 and a film drier 12. The film loading section 10 is the only portion of the processing machine that is situated in a darkroom set off by wall partition 13 and has a film holder 14 for holding sheets of exposed film. The loading section 10 has a platform 15 upon which a sheet of exposed film is placed and fed between two pairs of oppositely disposed transport rollers 16, 17 drivingly connected together by gears 18, 19 as seen in FIG. 3. Microswitches 21 are positioned above one of the rollers 17 and are closed by upward movement of the roller 17 to actuate a magnetic clutch 22 disconnecting the transport rollers 16, 17 from the main drive system when two sheets of film, one on top of the other, are mistakenly fed therethrough. The operator can then remove the film from the stopped rollers 16, 17 and singly feed them through the transport rollers which are once again drivingly connected to the drive system. The main drive system will be explained in greater detail hereinafter.

The wet processing section 11 is located outside of the darkroom and is fully enclosed and lighttight. The wet section 11 has four tanks disposed in side-by-side relation; the first tank 23 containing a developer solution, the second tank 24 a hardener stop bath solution, the third tank 25 a fixer solution and the fourth tank 26 a wash solution or water. The developer solution may be of any known type such as Kodak Rapid X-ray Developer which is commercially available. The hardener stop bath formula is a modified Kodak Hardener F–5a formula with the addition of 120 grams per liter of sodium sulfate instead of sodium sulfite. The useful pH range of the hardener bath in practice is preferably 4.2 to 4.8. As the pH of the bath increases during use, the films become more tacky in the drier 12. The addition of the sodium sulfate to the hardener bath restricts the swelling of the gelatinous coatings of the film and prevents the tackiness of the film from becoming excessive during drying. The addition of sodium sulfate to the hardener stop bath further promotes better washing at a lower pH value.

The fixing bath is a relatively high pH formula similar to Kodak Fixing Bath F–24 compounded with ammonium thiosulfate for rapid fixing and rapid removal of hypo during washing. Although a high pH fixing bath is desirable for more rapid washing, it also tends to produce a film with a greater degree of tackiness during drying. Since the film is being transported by rollers engaging at least one gelatinous coating of the film, it is desired to hold the tackiness of the film to a minimum.

Figure 1:
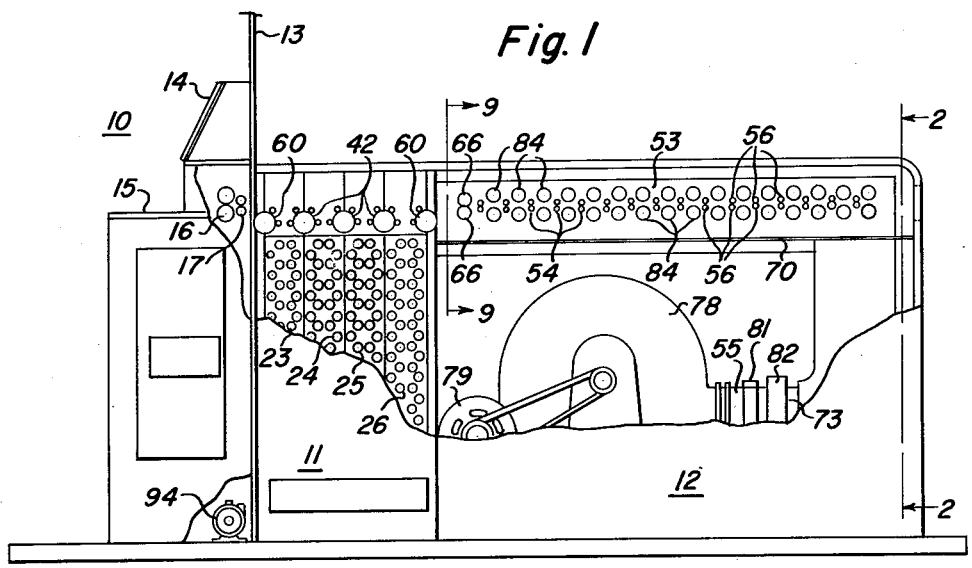
FIG. 1 is a side elevation view of a processing machine embodying the invention with a portion thereof sectioned to schematically show the roller transport system.
Figure 4:
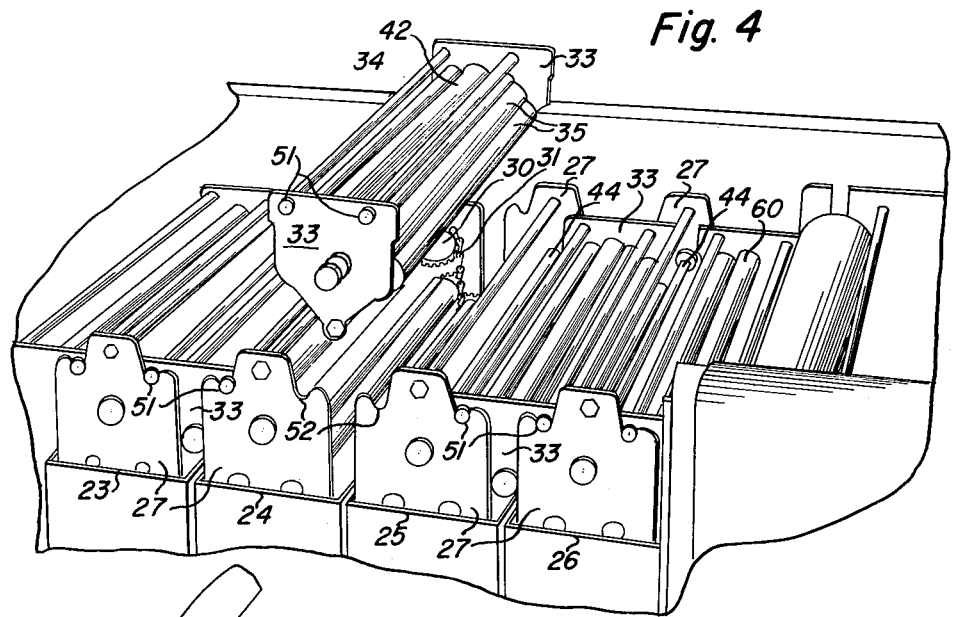
FIG. 4 is a fragmentary view in perspective of a portion of the wet processing section with a 180° crossover roller system, shown in a removed position.
Figure 6:
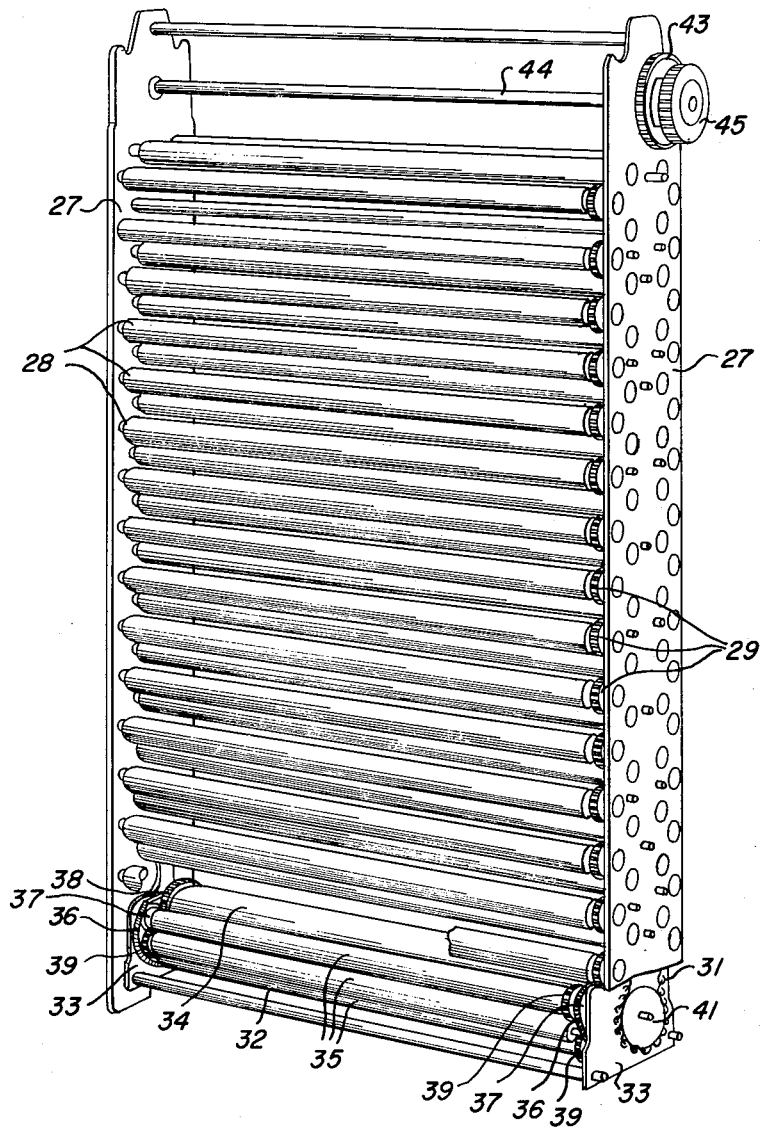
FIG. 6 is a perspective view of a roller-transport mechanism for transporting the film through the processing liquid baths with a portion thereof broken away to expose certain parts.
Figure 7:
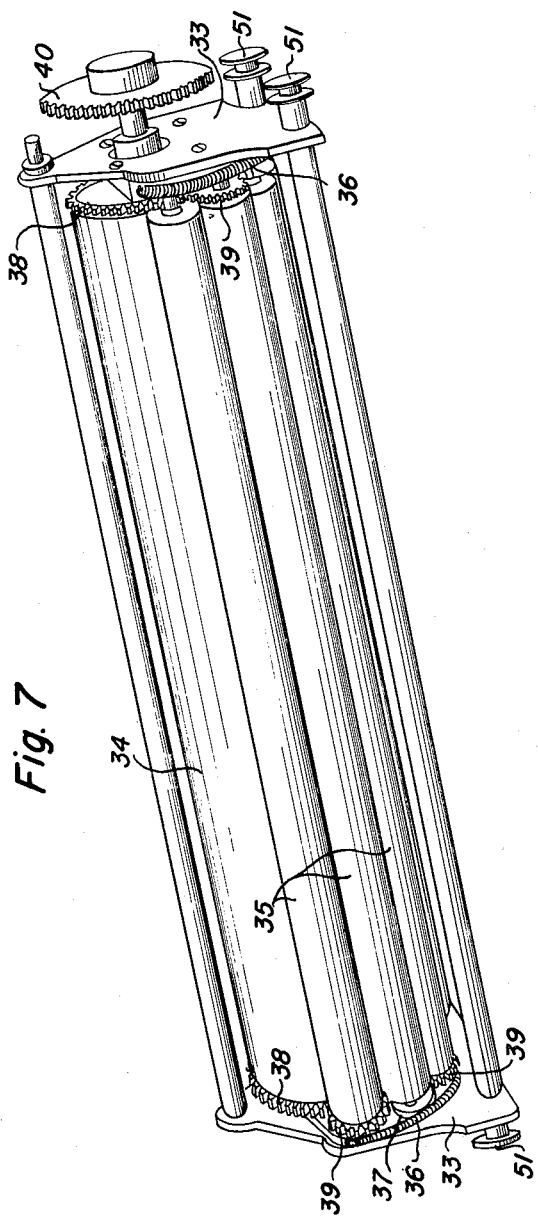
FIG. 7 is a perspective view of the crossover roller-transport mechanism adapted to turn the film through an angle of 180°.
Figure 8:
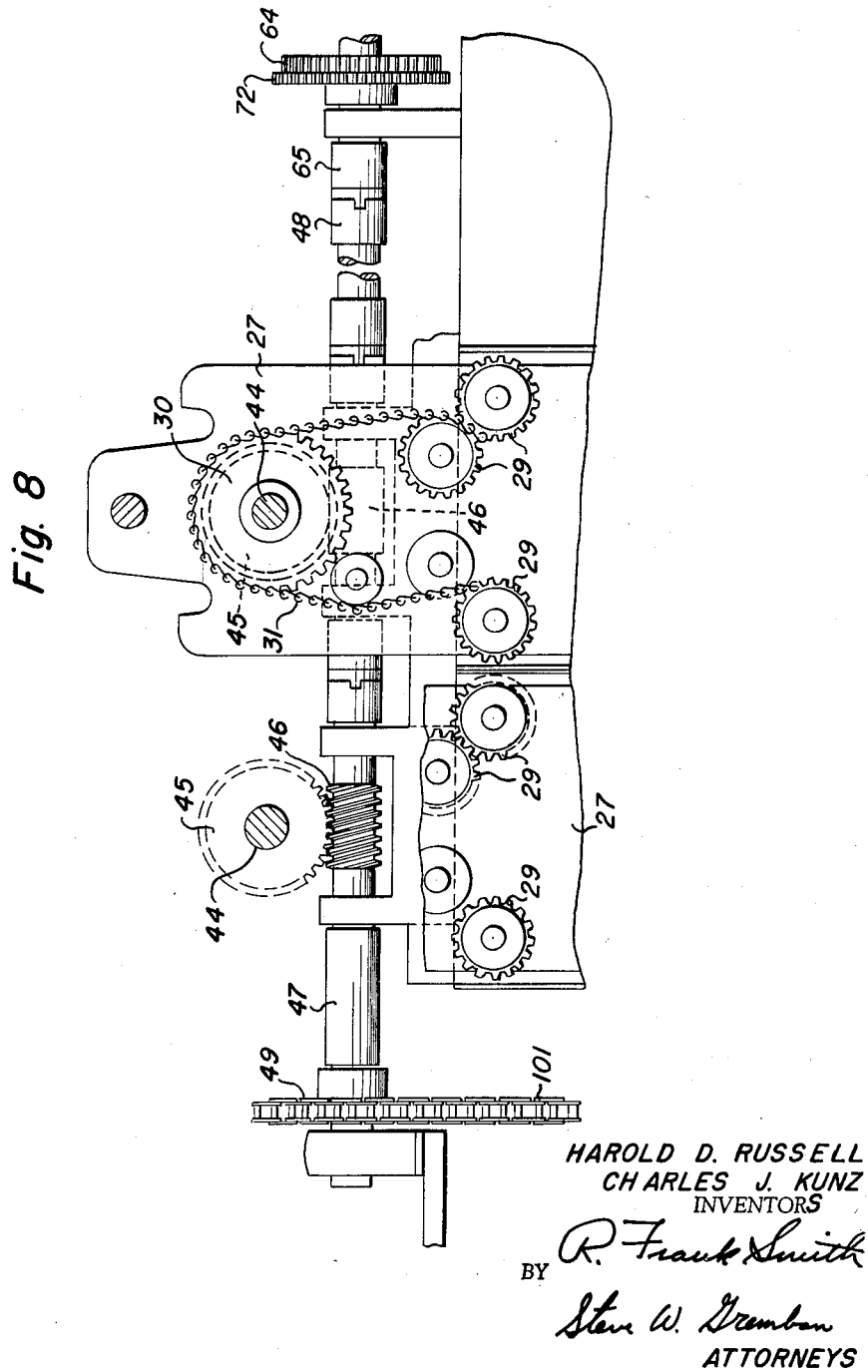
FIG. 8 is a fragmentary elevation view of a portion of the web processing section with a part thereof broken away.

Each of the tanks in the wet processing section 11 is provided with a frame member 27 carrying a plurality of parallel, staggered rollers 28 arranged in offset relation as seen in FIGS. 1 and 6 for transporting the film downwardly and upwardly within each tank. The rollers 28 are provided with sprockets 29 near one end which are drivingly connected to one another by an endless chain 31 as seen in FIGS. 4, 6 and 8. Each member 27 is provided at the bottom with a turn-around roller system 32 as shown in FIG. 6 for turning the film through an angle of 180° when it reaches the bottom of the tank. The roller system 32 comprises a frame 33 for supporting a large diameter roller 34. A plurality of small diameter rollers 35 are disposed around approximately 180° of the periphery of the roller 34 and urged into engagement therewith by springs 36 secured to the frame 33 at each end of the system with the intermediate portion of the spring passing over pulleys 37 carried by the ends of the rollers 35. The roller 34 is provided with gears 38 at each end drivingly connected to gears 39 carried by the rollers 35. One end of the shaft of the roller 34 passes through an opening formed by the frame 32 and is provided with a sprocket 41 connected by the endless chain 31 to the sprockets 29 and a sprocket 30 mounted on a drive spindle 44 carried by the frame member 27, as seen in FIGS. 6 and 8. A similar type of crossover roller system 42, as seen in FIGS. 4 and 7, is provided at the top of the tanks and interposed between adjacent tanks to transport the film from one tank through an angle of 180° into the adjacent tank and to remove the surface water from the film. All parts of the roller system 42 that are identical to similar parts of roller system 32 will be represented by the same numbers. In the roller systems 42, the shaft of roller 34 is lengthened and a gear 40 instead of a sprocket 41, as in system 32, is secured to the shaft to mesh with a gear 43 mounted on the drive spindle 44. Gear 45 secured to the drive spindle 44, as seen in FIGS. 6 and 8, meshes with a worm 46 carried by a shaft 47 having a coupling 48 at one end and a gear 49 at the other. The frame 33 is further provided with support elements 51 received by recesses 52 formed by the frame member 27 to support the roller systems 42 between adjacent tanks. Rotation of the shaft 47 by the drive system causes the worm 46 to drive gear 45 to rotate spindle 44. Rotation of spindle 44 causes sprocket 30 to drive the rollers 28 and turn-around system 32, and gear 43 to drive gear 40 and the crossover roller system 42.

Figure 2:
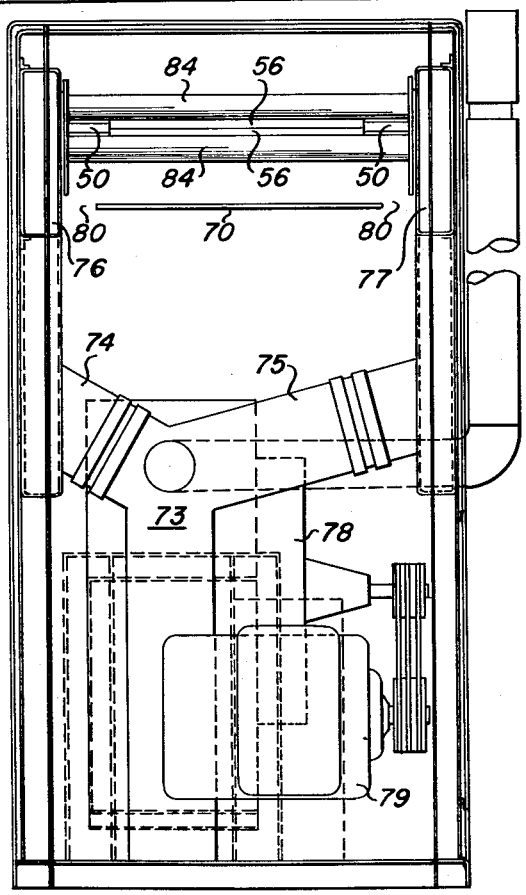
FIG. 2 is a view partly in section taken along line 2—2 of FIG. 1.
Figure 9:
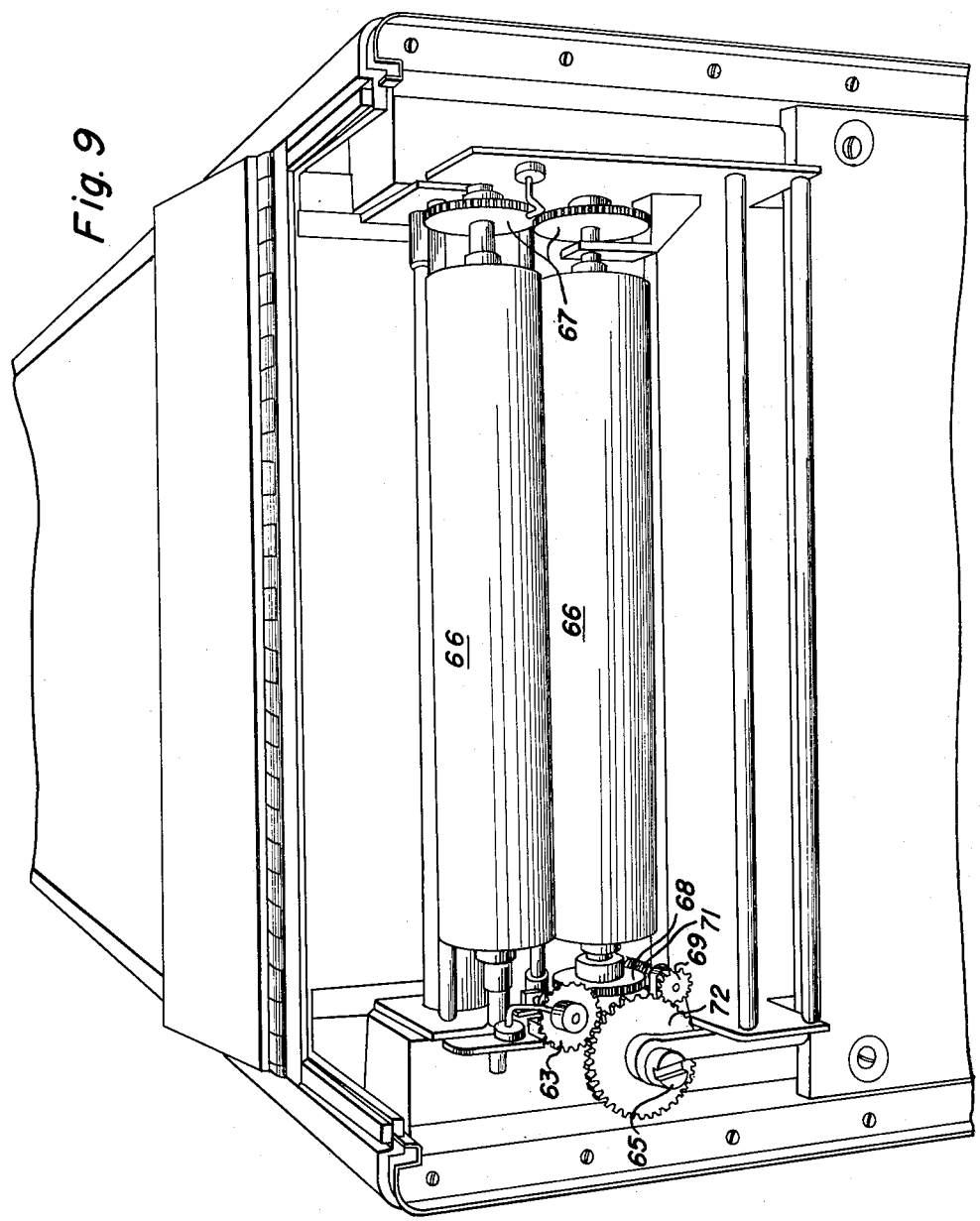
FIG. 9 is a perspective view of the entrance to the drier taken along line 9—9 of FIG. 1.
Figure 12:
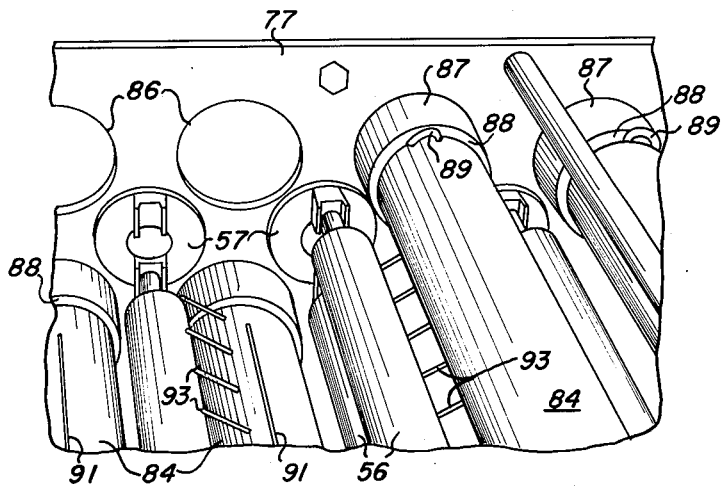
FIG. 12 is a fragmentary perspective view of a portion of the drier showing the opposite end of the rollers and air tubes of FIG. 11.

After the film has been thoroughly washed in the washing tank 25, it is directed into the drier 12 by a roller system 60, shown in FIGS. 1 and 4, similar to the crossover roller system 42 but adapted to turn the film through an angle of 90° instead of 180°. The drier 12 essentially comprises, as seen in FIG. 1, a drying chamber 53, a roller-transport system 54 for transporting the film therethrough and a warm air system 55 for drying the film. The roller-transport system 54, as shown in FIGS. 11 and 12, comprises pairs of oppositely disposed rollers 56 laterally spaced from one another and adapted to transport the film through the drying chamber 53. The rollers 56 do not extend across the drying chamber 53, as seen in FIG. 2, to provide a passageway 50 through which air may be exhausted from the drying chamber 53. The rollers 56 are preferably made of a material that minimizes damage to the gelatinous coating of the film caused by the rollers adhering to or marring the coating when in contact therewith. Materials of this type are butyl rubber, synthetic polyethylene, Teflon, or rollers having an epoxy resin coating. One end of the rollers 56 is supported by brackets 57, as seen in FIG. 12, and the opposite end provided with pinions 58, as shown in FIG. 11, driven by worms 59 secured to a shaft 61 which is carried by support brackets 62. The shaft 61 has a gear 63 at one end, as shown in FIGS. 9 and 10, driven by a gear 64 carried by a stub shaft having a coupling member 65 at one end connected to the coupling member 48, as seen in FIG. 8. A pair of oppositely disposed squeegee rollers 66 is provided at the entrance of the drier 12, as shown in FIG. 9, drivingly connected together by gears 67 at one end. One of the rollers 66 is provided with a gear 68 at the opposite end connected by means of a pinion 69 and worm 71 to a drive gear 72 mounted on the stub shaft, as best seen in FIG. 10.

Figure 13:
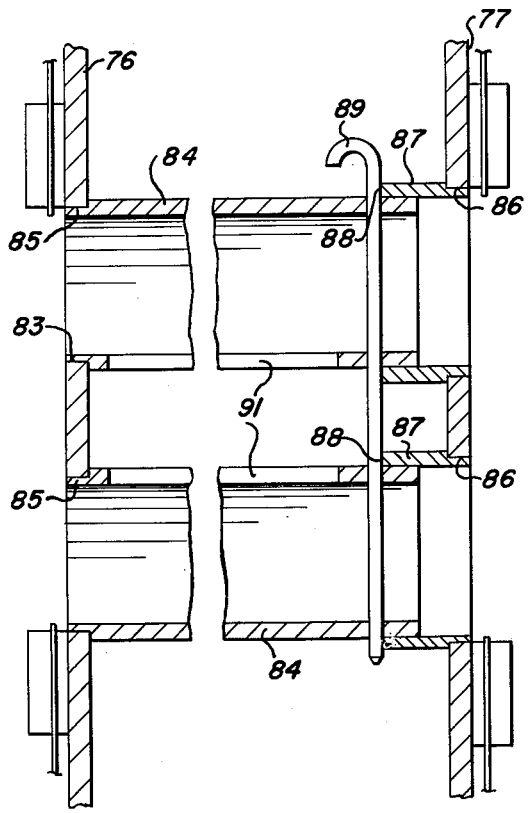
FIG. 13 is a fragmentary view in section showing the structure for aligning and removably securing the air tubes to the drier.

The warm air supply system 55, as seen in FIGS. 1 and 2, comprises a main duct 73 having one end forming two branches 74, 75 connected to air plenums 76, 77 disposed along each side of the drier 12 and forming the sides of the drying chamber 53. The opposite end of the duct 73 is connected to an air blower 78 driven by a motor 79. Interposed between the blower 78 and the duct 73 is an air heater 81 for heating the air to a temperature preferably ranging from 110° to 120° F., and a filter 82 for removing all the dirt particles contained therein. A baffle 70 forms the lower wall of the drying chamber 53 and cooperates with the sides of the drying chamber 53 to provide passages 80 along each side for exhausting air from the chamber to the inlet of the blower 78. The baffle 70 prevents the suction developed by the blower 78 from pulling the film out of the film path which is between the rollers 54. The plenums 76, 77 are provided with a plurality of openings 83, 86, respectively, as seen in FIGS. 11 and 12, for receiving cylindrical air-directing tubes 84. One end of each of the tubes 84 has a portion 85 of reduced outside diameter adapted to be inserted through one of the complementary openings 83, as seen in FIG. 13. The opposite end of the tube 84 is provided with a sleeve 87 having a portion at one end of reduced outside diameter adapted to be received by one of the complementary openings 86 in the other plenum 77. The opposite end of the sleeve 87 is cut along a plane that is at an angle with respect to the sleeve axis to form a cam surface 88. A pin 89 is inserted through openings formed completely through each pair of tubes 84 to properly align the tubes so that elongated slits 91 formed by each tube 84 are in register. Once the tube portions are inserted in the openings 83, 86, the sleeve 87 is turned about the tube 84 until the cam surface 88 engages the pin 89 to secure the tube to the plenums 76, 77. Each tube 84 is further provided with an adjusting screw 92, as seen in FIG. 11, for varying the width of the slit 91, and a plurality of spaced-apart guide wires 93 for guiding the film between the next adjacent drive rollers 56. The warm air is circulated through the drier 12 until it becomes laden with moisture and suitable venting means, not shown, is provided for venting the moisture-laden air and introducing additional air. The slits 91 of each pair of air tubes 84 which are in register with one another direct symmetrical sheets of warm air normal to and extending across the entire width of the film. The passageways 50 at the end of rollers 56, the passages 80 formed by the baffle 70 and the spaced-apart rollers 56 and air tubes 84 cooperate to provide an unrestricted path to the flow of air leaving the film surfaces and to eliminate any appreciable back pressure to the air directed against the film.

Figure 5:
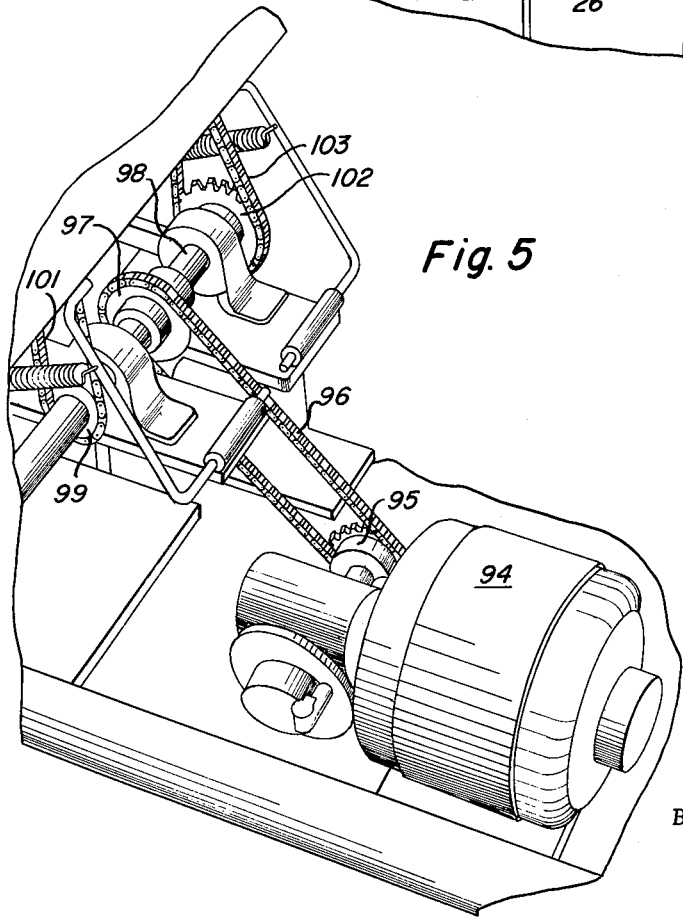
FIG. 5 is a perspective view of the drive motor for the entire roller-transport system of the processing machine.

The drive system for the processing machine is shown in FIG. 5 as including an electric motor 94 provided with a drive sprocket 95 connected by a chain 96 to a sprocket 97 secured to a shaft 98. The shaft 98 has a sprocket 99 laterally spaced from sprocket 97 and connected by a chain 101 to the sprocket 49 to provide motive power, as seen in FIG. 8, for the roller-transport system in the wet processing section 11 and for the roller-transport system in the drier 12. The shaft 98 has another sprocket 102 laterally spaced from sprocket 97 and connected by a chain 103 to a sprocket 104 secured to a stub shaft 105 which is operatively connected to the magnetic clutch 22, as seen in FIG. 3. The clutch 22 is also connected to a bevel gear 106 meshing with another bevel gear 107 carried by one end of one of the rollers 16.

In the operation of this invention, the operator in the darkroom removes a sheet of film from the film holder 14 and feeds the film to the transport rollers 16, 17 which direct the film to the film processing section 11. The film is transported by the rollers 28 and roller systems 32, 42 through the developer, stop bath, fixer and washing tanks 23, 24, 25 and 26, respectively, and thence through the squeegee rollers 66 which remove most of the remaining surface water from the film. The film is then transported by the rollers 56 through the drying chamber 53 where the gelatinous coating or coatings of the film are subjected to oppositely disposed symmetrical sheets of warm air directed normal to and extending across the entire width of the film.

Although but one embodiment has been illustrated and described, it will be apparent to those skilled in the art that various changes and modifications may be made therein without departing from the spirit of the invention or from the scope of the appended claims.

We claim:

1. In a self-threading machine suitable for processing a gelatin-coated film, the combination of: a plurality of processing tanks for containing suitable processing solutions; a first roller-transport mechanism removably insertable as a unit in each tank for transporting the exposed film through the processing solution contained in each tank; means for receiving the film from said first roller-transport mechanism of one tank, removing the surface liquid from the film and directing the film into said first roller-transport mechanism of the adjacent tank; a drying chamber; means for directing the film from the last tank into said drying chamber; a second roller-transport mechanism disposed in said chamber for engaging opposite sides of the film for transporting the film therethrough; a source of pressurized warm air; and oppositely disposed air directing means adapted to receive air from said source and to direct symmetrical sheets of warm air normal to and extending across the entire width of each side of the film transported therebetween by said second roller-transport mechanism.

2. The invention as defined in claim 1 wherein said first roller transport mechanism comprises a pair of spaced-apart plates for supporting two parallel rows of rollers arranged in staggered relation to transport the film downwardly, two parallel rows of rollers arranged in staggered relation to transport the film upwardly, and a central roller of large diameter having a plurality of rollers of smaller diameter disposed around a portion of its periphery to transport the film from one of said two parallel rows of rollers to the other of said two parallel rows of rollers.

3. The invention as defined in claim 1 wherein said first recited means comprises a central roller of predetermined diameter, a plurality of rollers of a diameter considerably smaller than said predetermined diameter disposed around aproximately 180° of the periphery of said central roller, and a spring for urging said plurality of rollers into engagement with said central roller.

4. The invention as defined in claim 1 wherein a pair of oppositely disposed squeegee rollers are interposed between said drying chamber and said last tank to remove the excess surface liquid from said film.

5. The invention as defined in claim 1 wherein said rollers of said second roller-transport mechanism are provided with a pinion at one end, and drive means including a worm gear interposed between said pinions of each pair of oppositely disposed rollers for positively driving said rollers.

6. The invention as defined in claim 1 wherein said air directing means comprise a plurality of cylindrical tubes parallel to said rollers of said second roller-transport mechanism and spaced from said film, and each of said tubes having a longitudinal slit of a length equal to or greater than the width of said film.

7. The invention as defined in claim 6 wherein said tubes are provided with an adjusting screw for adjustably varying the width of said slit.

8. The invention as defined in claim 1 wherein said source of warm air comprises a blower, a plenum disposed on each side of said drying chamber and extending along the length of said drying chamber transverse to said rollers of said second roller-transport mechanism, a duct connecting said blower to said plenum, and a heater for warming the air in said duct.

9. The invention as defined in claim 8 wherein a baffle forms the lower wall of said drying chamber and is interposed between said second roller-transport system and said blower, said baffle further cooperating with said plenums to form passages through which air from said drying chamber may be drawn by said blower.

10. The invention as defined in claim 8 wherein said plenums are provided with aligned openings for receiving opposite ends of said air directing means.

11. The invention as defined in claim 10 wherein said air directing means comprises a plurality of cylindrical tubes parallel to said rollers of said second roller-transport mechanism and spaced from said film, each of said tubes having a longitudinal slit of a length equal to or greater than the width of said film, each of said tubes further having a portion of reduced diameter at one end adapted to be received by one of said openings in one of said plenums, and a sleeve at the opposite end having one end of reduced diameter received by one of said openings in said other plenum.

12. The invention as defined in claim 11 wherein said sleeve has a cam surface formed by its opposite end, a pin extending transversely through each pair of oppositely disposed tubes to properly position said tubes with said slits in register, and said sleeve when turned causing said cam surface to engage said pin to secure said tube to said plenums.

13. In a self-threading processing machine, the combination comprising: a plurality of processing tanks for containing suitable processing solutions; a first roller-transport mechanism removably insertable as a unit in each tank for transporting exposed film through the processing solution contained in each tank; means comprising a unitary member interposed between and supported by adjacent first roller-transport mechanisms for receiving the film from said first roller-transport mechanism of one tank, removing the surface liquid from the film and directing the film into said first roller-transport mechanism of the adjacent tank; a drying chamber; means for directing the film from the last tank into said drying chamber; a second roller-transport mechanism disposed in said chamber for engaging opposite sides of the film for transporting the film therethrough; a source of pressurized warm air; and oppositely disposed air-directing means adapted to receive air from said source and to direct symmetrical sheets of warm air normal to and extending across the entire width of each side of the film transported therebetween by said second roller-transport mechanism.

References Cited in the file of this patent

UNITED STATES PATENTS

| | | |
|---|---|---|
| 1,479,453 | Carleton et al. | Jan. 1, 1924 |
| 1,569,156 | Thompson | Jan. 12, 1926 |
| 1,603,512 | Carleton et al. | Oct. 19, 1926 |
| 1,789,132 | Birch | Jan. 13, 1931 |
| 1,919,926 | Bodan | July 25, 1933 |
| 1,940,202 | Bodan et al. | Dec. 19, 1933 |
| 2,244,170 | Miketta et al. | June 3, 1941 |
| 2,501,251 | Zolinger | Mar. 21, 1950 |
| 2,640,277 | Dungler | June 2, 1953 |
| 2,913,973 | Bull et al. | Nov. 24, 1959 |

FOREIGN PATENTS

| | | |
|---|---|---|
| 577,430 | Great Britain | May 17, 1946 |
| 273,715 | Switzerland | Feb. 21, 1949 |